UNITED STATES PATENT OFFICE.

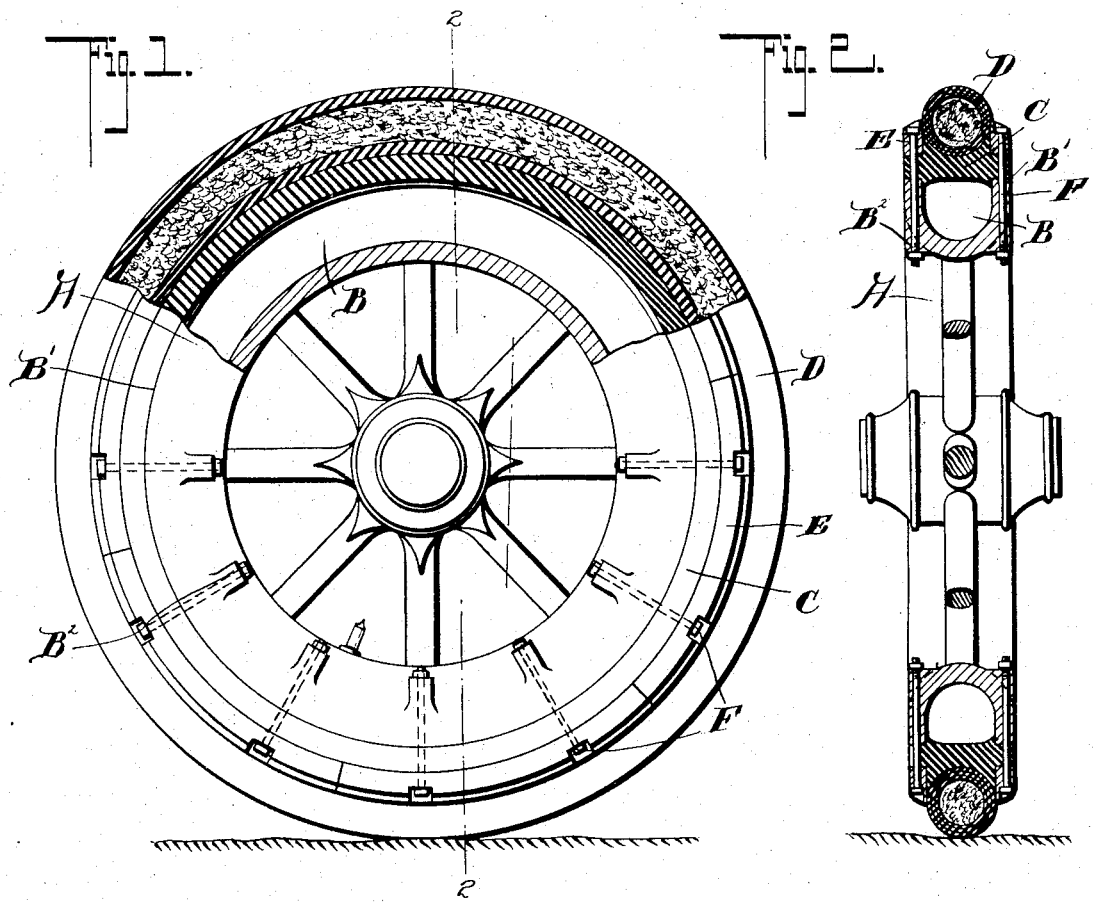

WILLIAM ALLEN McCAULEY, OF BROOKLYN, NEW YORK.

AUTOMOBILE-WHEEL.

994,418.     Specification of Letters Patent.     Patented June 6, 1911.

Application filed August 6, 1908. Serial No. 447,293.

*To all whom it may concern:*

Be it known that I, WILLIAM A. Mc-CAULEY, a citizen of the United States, residing at Brooklyn, in the county of Kings and State of New York, have invented a new and useful Improvement in Automobile-Wheels, of which the following is a specification.

This invention relates to automobile wheels and more particularly to tires for the same, the object being to provide the wheel with a grooved rim over which is secured a flexible hoop provided with a concaved seat to receive a flexible tube which is adapted to be filled with compressed cotton or any other suitable flexible material.

Another object of my invention is to provide very novel means for securing the hoop on the rim so that a perfect air-tight joint will be formed, so that the rim can be filled with compressed air to increase the resiliency of the same.

Another object of my invention is to provide fastening members which can be easily and quickly detached so that the tire can be removed when desired.

With these objects in view the invention consists in the novel features of construction, combination and arrangement of parts hereinafter fully described and pointed out in the claim.

In the drawing forming a part of this specification:—Figure 1 is a side elevation of my improved wheel partly in section. Fig. 2 is a section taken on line 2—2 of Fig. 1.

In carrying out my improved invention I employ a wheel A which is provided with a deep grooved rim B having square upper edges B' and provided with spaced oppositely disposed offset portions B² which are provided with vertical bores for the purpose hereinafter fully described. Arranged over the rim is a hoop C preferably formed of rubber or some very flexible material having an annular grooved rib, in the groove of which is adapted to be arranged a flexible tube D which is filled with compressed cotton or any suitable flexible material. Segmental clamping rings E are arranged on the flexible hoop against the rib and extend up alongside of the tube D, so as to hold the same in position. The rings are provided with openings registering with openings formed in the hoop which register with the vertical bores of the offset portions, and through which are adapted to extend bolts F for clamping the segmental rings tightly down on the edges of the grooved rim so as to form an air-tight joint and it will be seen that an air space will be formed in the rim which can be filled with compressed air for forming an air-cushion.

From the foregoing description it will be seen that I have provided an automobile wheel which is exceedingly simple and cheap in construction and one which will be very resilient so as to reduce the jar.

Having thus fully described my invention, what I claim as new and desire to secure by Letters Patent is:—

An automobile wheel having a deep grooved rim provided with square upper edges and spaced oppositely disposed apertured offset portions, said rim forming an air chamber, a rubber hoop arranged over said rim provided with openings registering with the apertures of said offset portions, said hoop being provided with a central annularly grooved rib, a flexible tube filled with flexible material arranged in the groove of said rib, a segmental ring arranged on said hoop at each side of said rib provided with openings registering with the openings of said hoop, and bolts passing through the openings of said rings, hoop and offset portions of the rim for clamping said hoop over said rim to form an air tight joint, said rings extending up alongside of said flexible tube for holding the same in position.

WILLIAM ALLEN McCAULEY.

Witnesses:
ALCUIN KAISER,
ROBERT H. GEORGE.